United States Patent
Patrov

(10) Patent No.: US 10,532,511 B2
(45) Date of Patent: Jan. 14, 2020

(54) INFILL TECHNIQUES IN THREE-DIMENSIONAL PRINTING

(71) Applicant: MakerBot Industries, LLC, Brooklyn, NY (US)

(72) Inventor: Andrey V. Patrov, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 637 days.

(21) Appl. No.: 15/167,422

(22) Filed: May 27, 2016

(65) Prior Publication Data

US 2016/0346999 A1    Dec. 1, 2016

Related U.S. Application Data

(60) Provisional application No. 62/167,007, filed on May 27, 2015.

(51) Int. Cl.
| | |
|---|---|
| *B29C 64/386* | (2017.01) |
| *B33Y 50/02* | (2015.01) |
| *B29C 64/106* | (2017.01) |
| *B29K 105/00* | (2006.01) |
| *B33Y 10/00* | (2015.01) |

(52) U.S. Cl.
CPC ......... *B29C 64/106* (2017.08); *B29C 64/386* (2017.08); *B29K 2105/0067* (2013.01); *B33Y 10/00* (2014.12); *B33Y 50/02* (2014.12)

(58) Field of Classification Search
CPC ............................. B29C 64/106; B33Y 10/00
USPC ......................................................... 264/308
See application file for complete search history.

(56) References Cited

U.S. PATENT DOCUMENTS

| | | | | |
|---|---|---|---|---|
| 8,114,544 B1 * | 2/2012 | Salguero | ................. | H01M 8/16 |
| | | | | 429/231.8 |
| 9,908,291 B2 * | 3/2018 | Mech | ..................... | B33Y 10/00 |
| 10,117,968 B2 * | 11/2018 | Lewis | ..................... | B29C 64/40 |
| 2012/0092724 A1 * | 4/2012 | Pettis | .................. | B29O 64/386 |
| | | | | 358/1.15 |
| 2013/0040091 A1 * | 2/2013 | Dikovsky | ............ | B29O 64/386 |
| | | | | 428/68 |
| 2017/0368758 A1 * | 12/2017 | Touma | ................... | B33Y 30/00 |

* cited by examiner

*Primary Examiner* — Robert C Dye
*Assistant Examiner* — Russell E Sparks
(74) *Attorney, Agent, or Firm* — Strategic Patents, P.C.

(57) ABSTRACT

In an aspect, infilling includes one or more the following characteristics: (i) adjacent rows and columns, which may be overlapping or non-overlapping; (ii) no sharp angle turns, i.e., no turns of ninety degree or less; and (iii) intersecting between infill patterns occurs from layer to layer (i.e., at offset z-axis positions). An infilling technique may also or instead include rotating the infill pattern about ninety degrees in some alternating fashion from layer to layer.

10 Claims, 16 Drawing Sheets

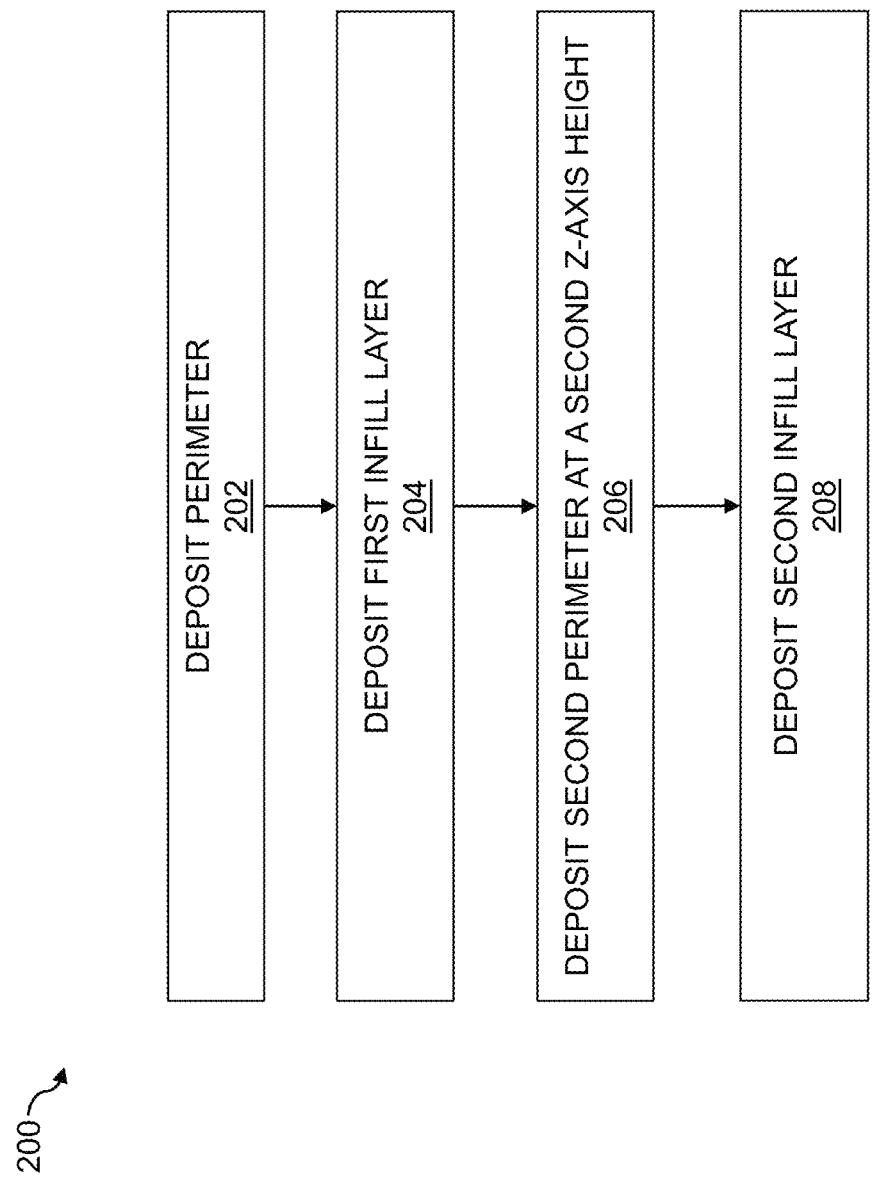

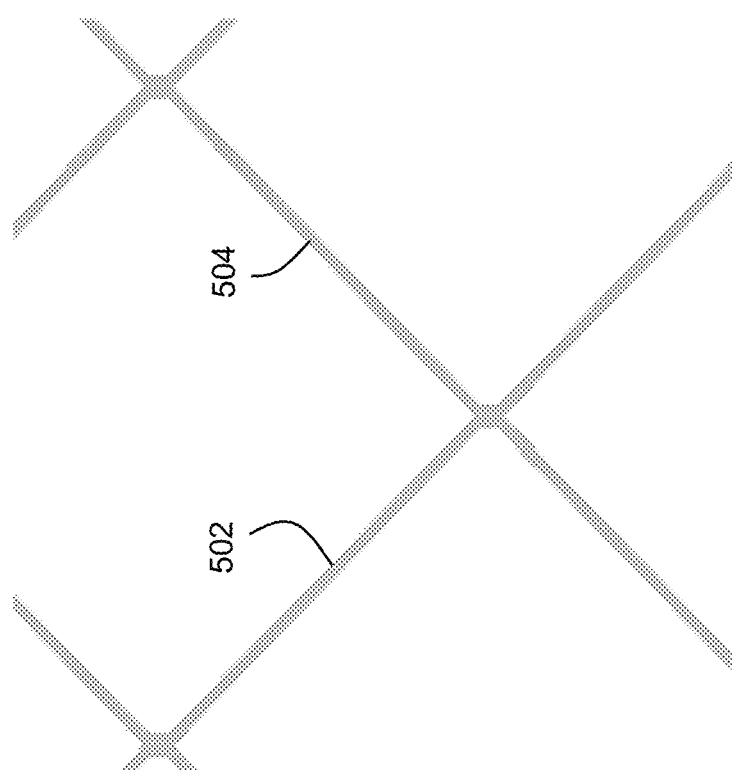

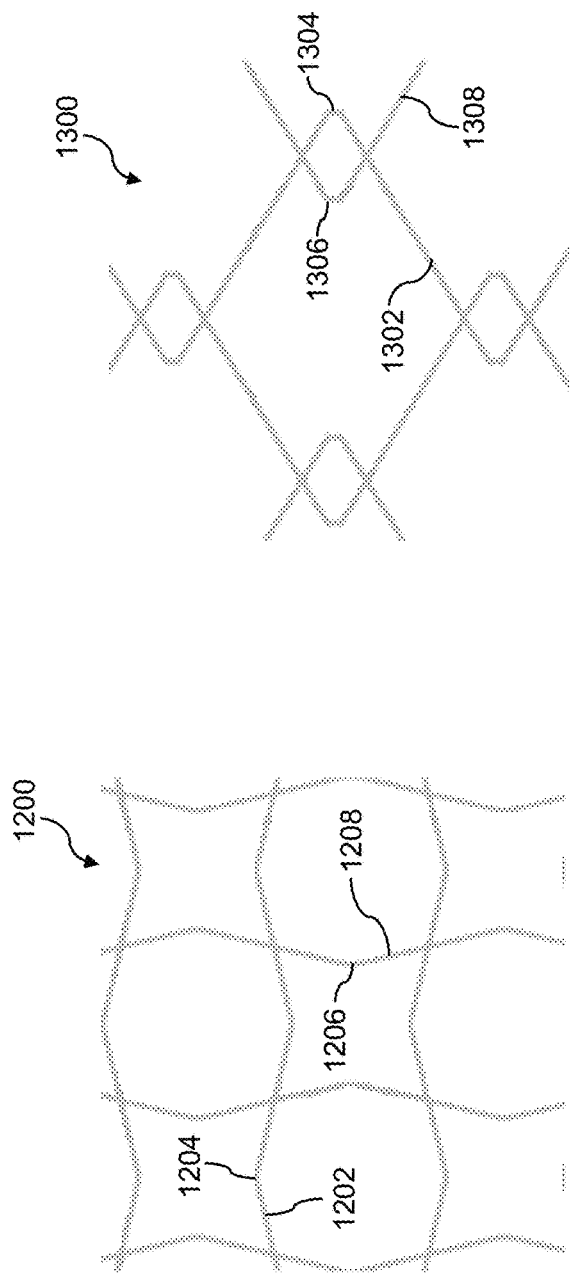
Fig. 12
Fig. 13
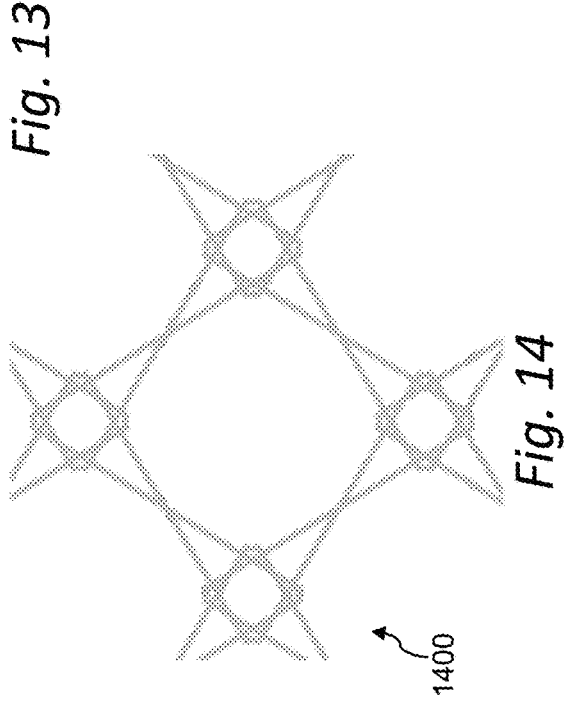
Fig. 14

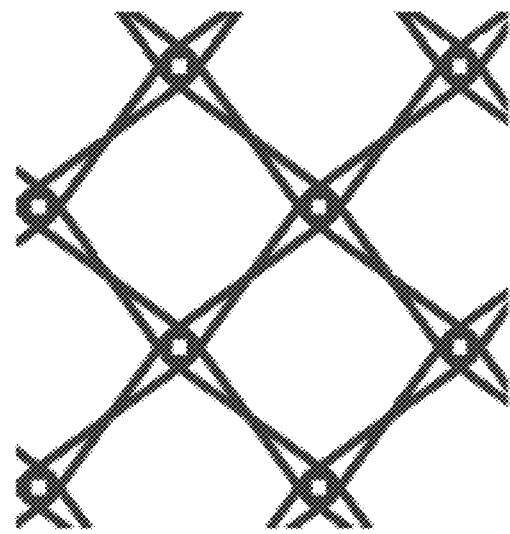
Fig. 31
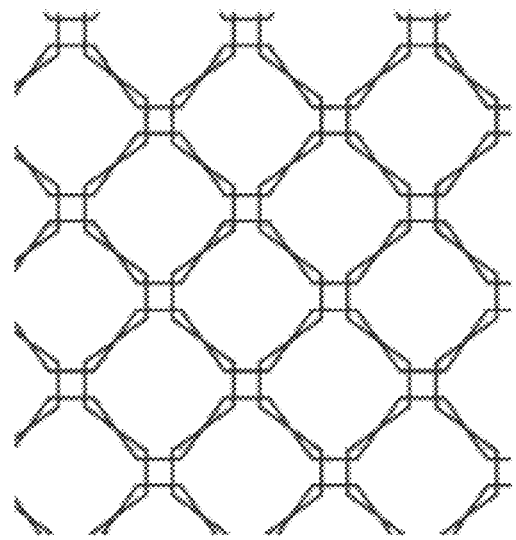
Fig. 30
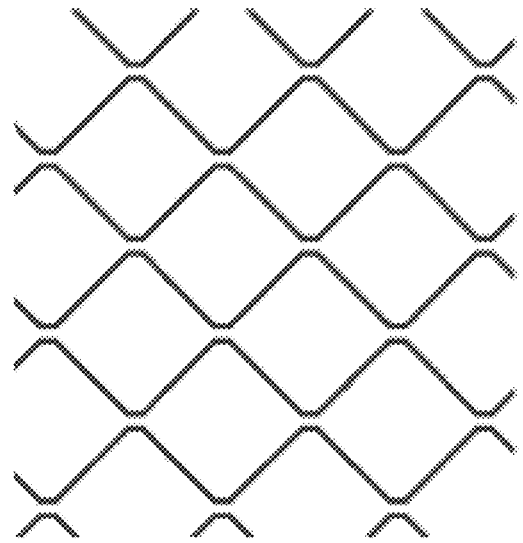
Fig. 32
Fig. 33

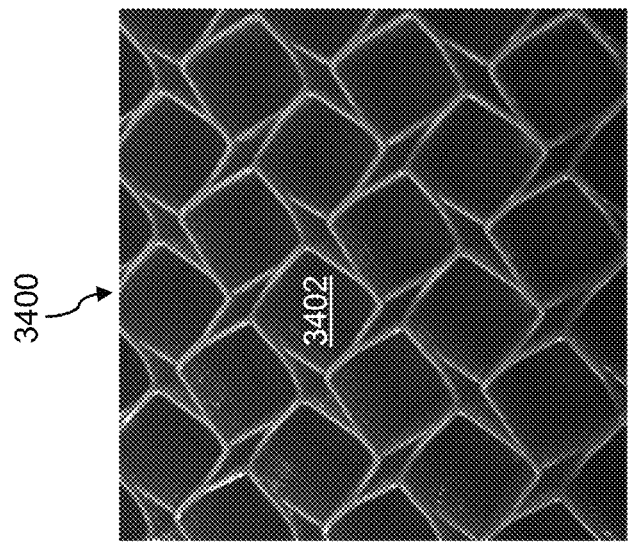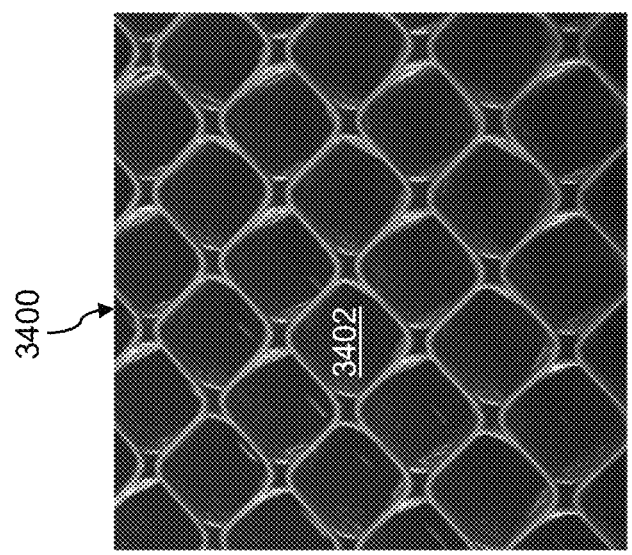
Fig. 34

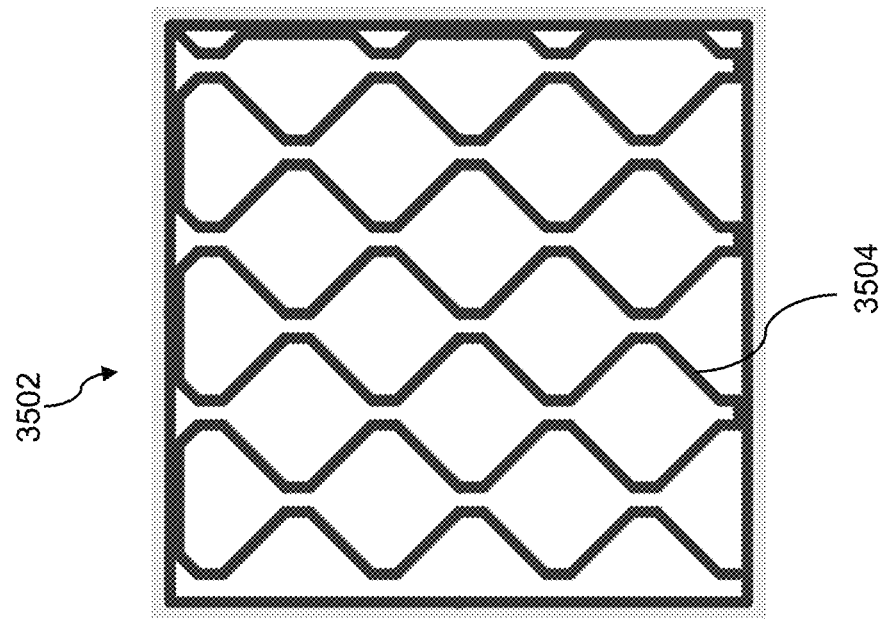
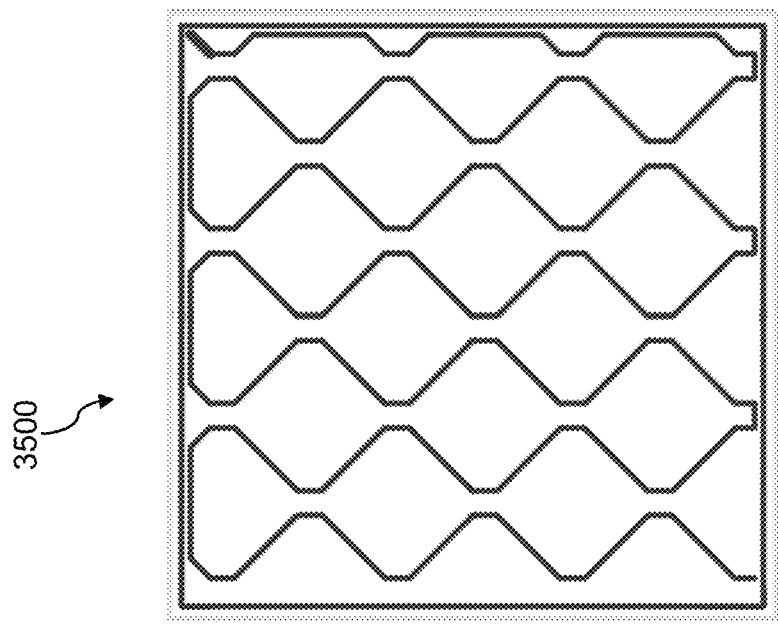
Fig. 35

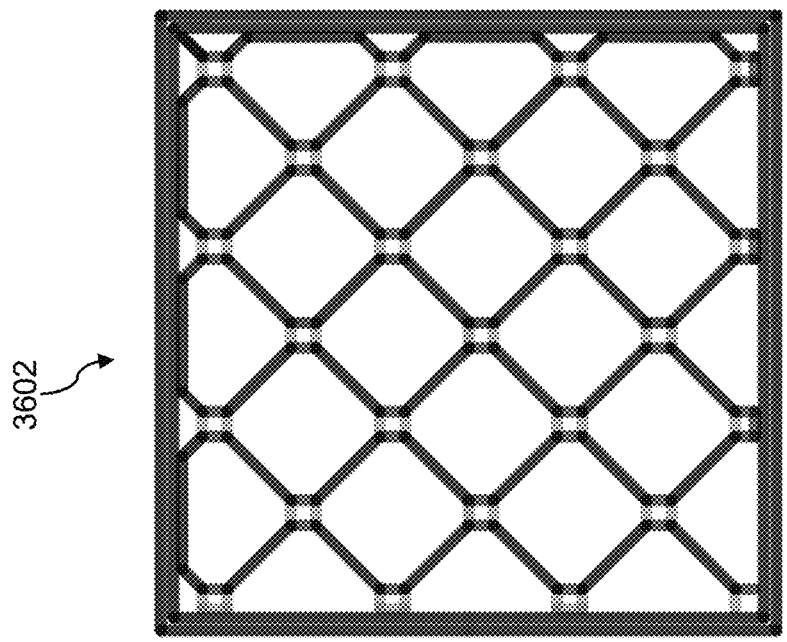
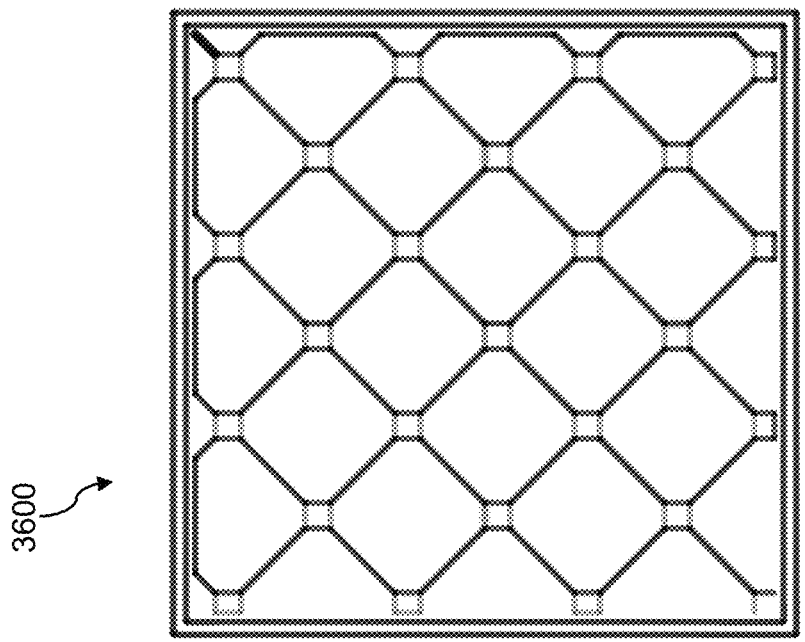
Fig. 36

INFILL TECHNIQUES IN THREE-DIMENSIONAL PRINTING

This application claims the benefit of U.S. Provisional Application No. 62/167,007 filed on May 27, 2015, the entire content of which is hereby incorporated by reference.

TECHNICAL FIELD

The disclosure relates to infilling techniques for three-dimensional printing, and more specifically to infill patterns that improve the strength and dimensional stability of a fabricated object without detrimentally affecting fabrication speed.

BACKGROUND

A variety of three-dimensional printing techniques exist to reproduce essentially any object with a desired exterior. However, for an object with a given exterior, there are many ways to fill the enclosed, interior volume, a process generally referred to as infilling. For example, one can fill the entire volume with build material, which increases strength but takes longer and uses more material. Alternatively, a variety of regular or varying geometric patterns can be used, or no infill at all can be used, which leads to a minimum use of build material and a reduction in build time, but may produce a highly fragile printed object. There remains a need for improved infilling techniques for three-dimensional printing.

SUMMARY

In an aspect, infilling includes one or more the following characteristics: (i) adjacent rows and columns, which may be overlapping or non-overlapping; (ii) no sharp angle turns, i.e., no turns of ninety degree or less; and (iii) intersecting between infill patterns occurs from layer to layer (i.e., at offset z-axis positions). An infilling technique may also or instead include rotating the infill pattern about ninety degrees in some alternating fashion from layer to layer.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 2 is a flow chart of a method for infilling an object during a three-dimensional fabrication process.
FIGS. 3-34 show various infill patterns.
FIG. 35 shows a first layer of an infill pattern.
FIG. 36 shows a second layer of an infill pattern.

DETAILED DESCRIPTION

The embodiments will now be described more fully hereinafter with reference to the accompanying figures, in which preferred embodiments are shown.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, terms such as "first," "second," "top," "bottom," "above," "below," "up," "down," and the like, are words of convenience and are not to be construed as limiting terms unless specifically stated to the contrary.

The following description emphasizes three-dimensional printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

Figure 1:
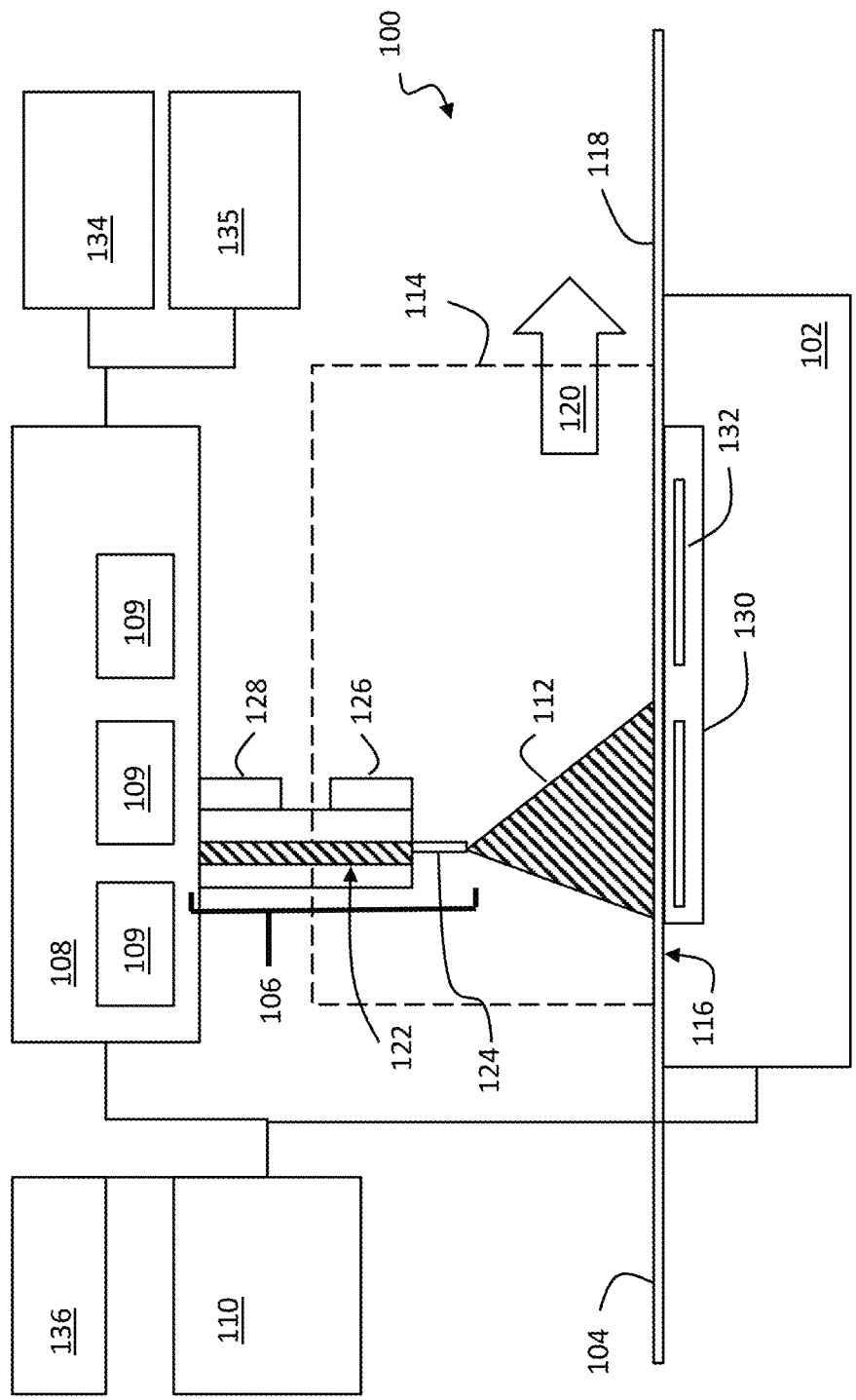
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heater that provides active heating to the build platform 102, a cooling element that provides active cooling to the build platform 102, or a combination of these. The heater 130 may be coupled in a communicating relationship with the controller 110 in order for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyer may include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (in bi-axial form, polyethylene terephthalate is sold under the trademark MYLAR), a polyimide film (sold under the trademark KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface and/or removal of completed objects from the surface. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyor 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyor 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyer 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus, in one aspect there is a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and the like.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and the like. Other hardware 135 may also or instead include a variety of cable connections and/or hardware adapters for connecting to, e.g., external computers, external hardware, external instrumentation or data acquisition systems, and the like.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a wireless broadband connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

Devices, systems, and methods for infilling an object being fabricated in a three-dimensional printing process will now be described. In general, infilling provides structural support to an object fabricated during a three-dimensional printing process. The techniques described herein are able to provide structural integrity and dimensional stability, all while enabling relatively fast print speeds.

In the prior art, sparse infilling may be printed as alternating orthogonal layers, with the combined layers forming a pattern such as a square or hexagonal grid. The alternating orthogonal layers can result in vertical gaps between every other layer. To avoid vertical gaps, it is possible to repeatedly print a single pattern without alternating, or to retract and skip over printed material in order to fill gaps. However, both of these approaches have drawbacks—printing a single repeating pattern strengthens the object along one axis only, and using retraction leads to longer print times, more extruder wear, and blobbing build material. Also, prior art techniques can include infill patterns without vertical gaps, but these techniques often include sharp angle turns, do not include other variations as discussed herein, and do not include hooking adjacent rows or layers for increased bonding therebetween.

The techniques discussed herein may include sparse infill patterns (e.g., saving time and material) without a need for retraction that result in no vertical gaps and that use an alternating pattern (or offset/off-phase pattern) for strength in multiple axes. The infill may also be printed relatively quickly, e.g., by avoiding sharp angles of ninety degrees or less.

In terms of speed, straight lines are the fastest to print, but straight lines generally contract, resulting in curling. Curling may distort an infill and pull any shells connected to the infill inward, affecting dimensional accuracy of a printed object. A linear infill pattern of the prior art may use long straight lines that are rotated by ninety degrees from one layer to the next. A hex infill of the prior art may use two different alternating patterns, both of which have sharp angle turns, and thus this hex infill pattern is relatively slow to print. However, the infill patterns and techniques contemplated herein may include paths that form patterns where intersections between the patterns occur at offset z-axis positions, while also including turns (or otherwise non-linear patterns) to avoid curling, where the turns are optimized for fast printing. The infill patterns and techniques contemplated herein may also or instead include a rotation of the pattern by about ninety degrees from one layer to the next.

In an aspect, infilling includes one or more the following characteristics: (i) adjacent rows and columns, which may be overlapping or non-overlapping; (ii) no sharp angle turns, i.e., no turns of ninety degree or less; and (iii) intersecting between infill patterns occurs from layer to layer (i.e., at offset z-axis positions). The infilling may also or instead include rotating the infill pattern about ninety degrees in some alternating fashion from layer to layer. Each of these characteristics is discussed in more detail below.

An infilling technique may include a series of adjacent rows and columns of infill patterns. For example, as an extruder (or other tool head) traverses a plane depositing build material in a path forming the infill pattern, e.g., in the x-direction, the pattern may be completely separated from an adjacent pattern offset in the y-direction. Thus, in an aspect, there is no overlap, touching, or coupling between adjacent infill paths disposed on the same x-y plane—in this manner, adjacent paths are not highly coupled like infill patterns of the prior art. Instead, the infill pattern may include a series of separated rows or columns. In certain aspects, the only intersection of infill patterns occurs in different x-y-planes, i.e., in offset z-axis positions (or more specifically, from one layer of infill pattern to the next layer of infill). Alternatively, some portion(s) of the adjacent rows or columns may touch within the same x-y plane—e.g., at vertices or the like.

An infilling technique may be configured such that there are no sharp angle turns, i.e., no turns of ninety degrees or less, e.g., by the tool head or the infill pattern itself. In other words, in an implementation, there are no ninety degree turns or acute angle turns. Instead, sharp angle turns may be approximated by a discrete series of turns greater than ninety degrees. For example, a turn may include a series of sequential (or substantially sequential) obtuse angle turns to obtain a ninety degree turn or other sharp angle turn. In another aspect, turns of ninety degrees may be included, but the number of sharp angle turns may be substantially reduced, or eliminated from certain portions or regions of infill. In yet another aspect, an infilling technique may instead limit the number of turns of ninety degrees (or turns having angles less than ninety degrees) instead of eliminating such turns altogether.

It will be appreciated that there are physical limitations on how tool instructions to a printer are converted into a physical path or material. Thus, even where sharp angle turns are avoided in the tool path, there may be sharp angle turns within the resulting layer of deposited material. Thus in one aspect, the techniques contemplated herein are used to produce paths of deposited material with no sharp angle turns. However, the advantages of the invention may more generally accrue when the tool path of the three-dimensional printer contains no sharp angle turns, even if the resulting mass of deposited material contains acute interior angles. Stated otherwise, the physically printed infill may include a deposited length of build material that has a ninety degree turn (or less than ninety degree turn) without receiving instructions for printing such a sharp angle turn. This may be the result of, e.g., a condition or property of the printing surface, a force exerted on the build material (e.g., pulling), excess deposition of build material around the tool path, a defect or property of the build material, a defect or property of the tool head (e.g., an extrusion opening in the tool head), and so forth. More generally, the presence of sharp angle turns may be evaluated with reference to the deposited material, or with reference to the underlying tool instructions, e.g., where relative x-axis and y-axis movements might be more readily discernible.

An infilling technique may include intersections (or the coupling of infill patterns) that occur from layer to layer, i.e., at offset z-axis positions. For example, a first infill pattern may form a first layer in a first plane, where the first infill pattern includes a series of rows or paths having vertices, e.g., where the vertices are formed by a series of turns having angles greater than ninety degrees. A second infill pattern may form a second layer located above (or below) the first pattern in a second plane, i.e., where the first plane and the second plane are located in adjacent z-axis positions. The second infill pattern may similarly include a series of rows or paths having vertices, e.g., formed by a series of turns having angles greater than ninety degrees, and the vertices of the first infill pattern may overlap with the vertices of the second infill pattern to form a z-axis bond between the first infill pattern and the second infill pattern. It is possible that the first infill pattern and the second infill pattern be the same pattern or different patterns. In an aspect, if the first infill pattern and the second infill pattern are the same pattern, they may be offset from each other along their respective x-y planes, as well as along the z-axis. There may also or instead exist a phase shift between the first infill pattern and the second infill pattern.

An infilling technique may be configured such that alternative layers (e.g., every other layer, or some other alternating pattern/fashion) of infill patterns in the x-y plane are rotated relative to one another, e.g., rotated by substantially ninety degrees. For example, in one aspect, every infill pattern layer in the x-y plane is rotated to be perpendicular to the layers located directly above and below.

The infilling techniques described herein may provide many advantages. For example, the adjacent rows and columns may each include infill patterns other than straight lines, because straight lines can distort the surface of an object being fabricated, e.g., causing shrinking, curling, warping, or stretching. Also, sharp angle turns may generally slow down a three-dimensional printing process, and thus the avoidance of sharp angle turns helps maintain relatively fast print speeds. Further, rotating or offsetting the infill patterns along the z-axis (e.g., where successive layers of infill patterns in the x-y plane are phase-shifted or rotated relative to layers above or below) may provide strength in the z-axis. The rotation or shift of the infill patterns can also form cells that provide structural integrity to a printed object. Thus, in an embodiment, not only is the infilling able to be fabricated in a relatively short period of time (e.g., because of the avoidance of sharp angle turns and the inclusion of a sparse infill pattern), the infilling improves dimensional stability and structural integrity, even along the z-axis.

FIG. 2 is a flow chart of a method for infilling an object during a three-dimensional fabrication process.

As shown in step 202, the method 200 may include depositing a perimeter of an object in a three-dimensional fabrication process. The perimeter may include a two-dimensional cross section of a shell of the object at a first z-axis height. Thus, in general, the perimeter may be referred to as the "shell," which defines the exterior of the fabricated object in that two-dimensional cross section. There may be multiple shells or layers to this perimeter path, according to the desired rigidity, strength, optical properties, and so forth. The perimeter may form the boundary of an infill pattern at a specific z-axis height.

As shown in step 204, the method 200 may include depositing a first infill layer for the perimeter. The first infill layer may include a first plurality of lengths of a build material spanning the perimeter in a first direction, e.g., spanning the perimeter along an x-axis, a y-axis, or some other direction in the x-y plane of the fabrication process. It will be understood that the terms x-axis and y-axis generally refer to control axes for an x-y-z gantry or the like, however, where these dimensions are theoretically arbitrary and the x and y axes may be in any directions, such as orthogonal directions within a plane through a working volume of a three-dimensional printer.

The first plurality of lengths may include non-intersecting paths of build material—i.e., for each pass across the cross section spanning the perimeter, the length does not intersect or contact any adjacent lengths that span the cross section in the same direction.

The first plurality of lengths may also include a first group of vertices with no turns having an angle less than ninety degrees (i.e., no sharp angle turns). Avoiding sharp angle turns in this manner avoids a significant slowdown in tool head speed that can occur when a path includes sharp angle turns such as any turn having an angle smaller than ninety degrees. Thus, the path or the pattern of the length may usefully approximate a ninety degree turn (or sharper angle turn) by using a sequence of obtuse-angled turns separated by relatively short, substantially straight segments.

In an aspect, each one of the first plurality of lengths of build material is parallel to one or more other ones of the first plurality of lengths. In another aspect, the adjacent paths may have the same shape, but are offset in phase, e.g., by about one hundred eighty degrees, so that vertices of one of the paths can be positioned nearby other vertices of adjacent ones of the paths. This particular configuration may facilitate an overlay that is rotated by ninety degrees to bond the adjacent vertices of the underlying layer to form a three-dimensional structure that is coupled across the x-axis and the y-axis. Various permutations of this feature are shown in the figures included herein.

Depositing the infill layer for the perimeter may also or instead include depositing an infill layer including a plurality of lengths of a build material spanning the perimeter in a direction, where the plurality of lengths include a group of at least two vertices with no turns having an angle less than ninety degrees. Another infill layer may be deposited directly on top of this infill layer, where the other layer includes a second plurality of lengths of build material spanning the perimeter. Each of the second plurality of lengths may include a second group of vertices with no turns having an angle less than ninety degrees, where the second group of vertices overlaps with at least one of the group of at least two vertices of the infill layer.

Depositing the infill layer for the perimeter may also or instead include a plurality of lengths having intersecting paths of build material, or paths that are otherwise coupled or touching. For example, in one aspect, the vertices of adjacent lengths are coupled.

As shown in step 206, the method 200 may include depositing a second perimeter of the object including a second two-dimensional cross section of the shell at a second z-axis height adjacent to the first z-axis height in the three-dimensional fabrication process. The second z-axis height may be directly above the first z-axis height such that the second perimeter is directly above the first perimeter.

As shown in step 208, the method 200 may include depositing a second infill layer for the second perimeter. The second infill layer may include a second plurality of lengths of the build material. The second plurality of lengths may include non-intersecting paths of build material including a second group of vertices with no turns having an angle less than ninety degrees. In an aspect, each one of the second plurality of lengths of build material is identical to and phase shifted by 180 degrees from an adjacent one of the first plurality of lengths of build material. Alternatively, the second plurality of lengths of build material may span the second perimeter in a second direction orthogonal to the first direction. For example, the second plurality of lengths of build material may span the second perimeter substantially along the x-axis, while the first direction is disposed substantially along the y-axis. In an alternate embodiment, the second plurality of lengths of build material may span the second perimeter in the first direction, e.g., along the same direction as the first plurality of lengths.

In an aspect, at least one of the second group of vertices overlaps with at least one of the first group of vertices to form a z-axis bond between the first infill layer and the second infill layer. The vertices may be formed by a plurality of turns greater than ninety degrees as described herein.

In an aspect, each one of the first plurality of lengths of build material do not contact each other one of the first plurality of lengths, and each one of the second plurality of lengths of build material do not contact each other one of the second plurality of lengths. In other words, there may be no overlap (or minimal overlap) between lengths disposed in the same x-y plane or z-axis height, and coupling among these paths can occur through an overlying layer at the next z-axis fabrication level. In another aspect, the first plurality of lengths of build material are each coupled to one another in one or more locations, and each one of the second plurality of lengths of build material are coupled to each other one of the second plurality of lengths in one or more locations. In other words, there may optionally be some overlap between lengths disposed in the same x-y plane.

The infill techniques may thus include different infill layers and/or different infill patterns. For example, a first infill pattern may include offset rows, and a second infill pattern may include offset columns, where each of the first and second infill patterns are perpendicular to one another. In another aspect, the first infill pattern and the second infill pattern may be offset or phase shifted from one another instead of, or in addition to, being perpendicular to each other.

The first infill layer, the second infill layer, and so on, may create an infill for the object being fabricated in the three-dimensional fabrication process as described herein. The first infill layer, the second infill layer, and so on, may form a series of rows or columns disposed on the interior surface of the object being fabricated in the three-dimensional fabrication process.

In one aspect, the technique described above may be used to deposit infill that consists mostly or exclusively of non-sharp angle turns. For example, the method 200 as described above may include depositing a perimeter of an object in a three-dimensional fabrication process, the perimeter including a two-dimensional cross section of a shell of the object; and depositing a first infill layer for the perimeter, the first infill layer including a plurality of lengths of build material spanning the perimeter in a direction, wherein the plurality of lengths consist of a first group of vertices with no turns having an angle less than ninety degrees. The overlaying layer of infill may similarly use non-sharp angle turns with vertices overlapping the vertices in the first layer. Thus, the method 200 may further include depositing a second infill layer disposed on top of the first infill layer, the second infill layer including a second plurality of lengths of build material spanning the perimeter, each of the second plurality of lengths consisting of a second group of vertices with no turns having an angle less than ninety degrees, at least one of the second group of vertices of the second infill layer overlapping at least one of the first group of vertices of the infill layer.

A system including any three-dimensional printing hardware described herein or otherwise known in the art may implement any of the aforementioned infilling techniques. The system may also or instead include control circuitry configured to operate three-dimensional printing hardware to fabricate a three-dimensional object from a three-dimensional model that describes, at least in part, a desired structure, where the control circuitry is configured to process the three-dimensional object to infill one or more enclosed volumes of the desired structure according to any of the contemplated infilling techniques described herein.

FIGS. 3-35 show various infill patterns.

Figure 3:
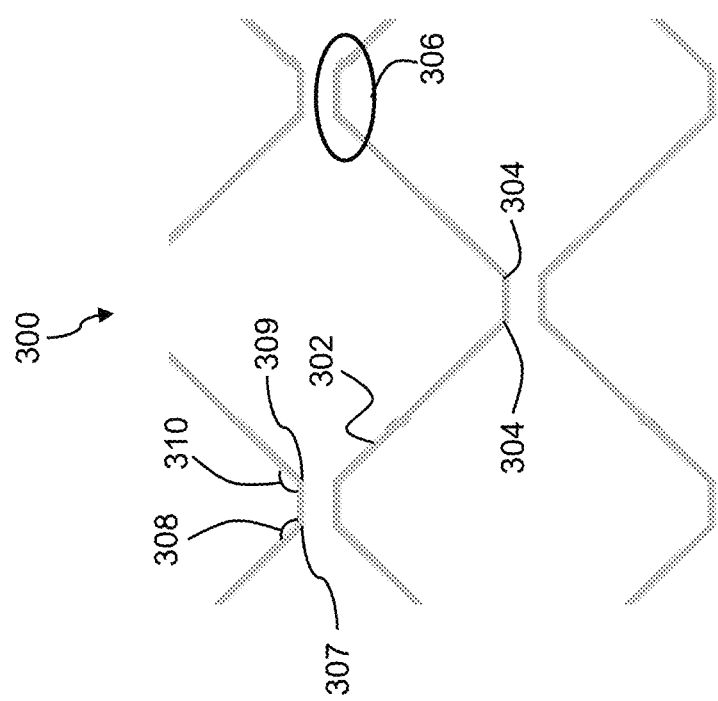

FIG. 3 shows an example of a single layer, i.e., a first infill pattern 300. The infill may generally include a number of lengths 302 of build material spanning an area to be infilled in a direction from left to right or horizontally in the figure. These lengths 302 may be non-overlapping and non-intersecting so that they are generally free to move within the infilled region. In this manner each length 302 may elastically relax independently of adjacent lengths, which advantageously avoids imposing stress on exterior walls of the object being infilled, and further avoids any related deformation, curling or other stress-related or cooling-related artifacts in the completed object. That is, as the length 302 cools and shrinks, the corners 304 at the vertices 306 may bend to accommodate shortening and straightening of the length 302.

As shown in the figure, the lengths 302 may include vertices 306 with no turns having an angle less than ninety degrees. Instead, a sharp angle turn may be approximated by a series of turns having angles greater than ninety degrees. As shown in the figure, this may include a first turn 307 including a first angle 308, and a second turn 309 including a second angle 310. In the figure, the first angle 308 and the second angle 310 are about 135 degrees, but other angles are also or instead possible.

Figure 4:
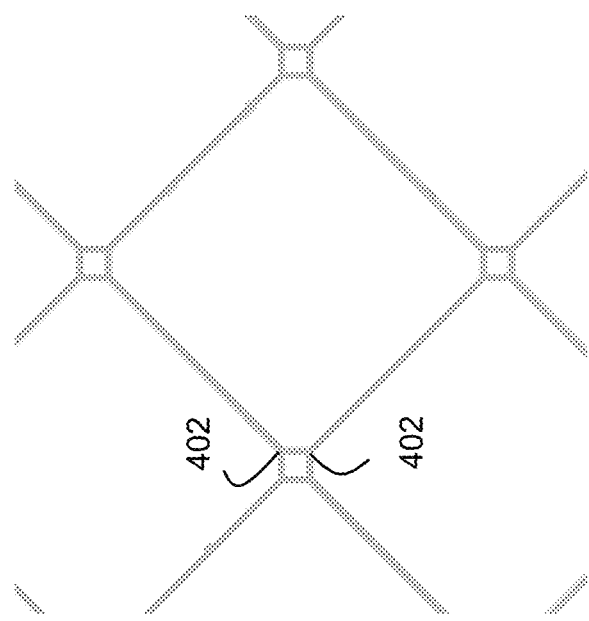

FIG. 4 shows an example of the results of printing two successive layers, where the second layer is rotated by ninety degrees from the first layer, e.g., a second infill pattern is disposed on top of the first infill pattern. Arranged in this manner, this next adjacent z-axis layer forms a number of bonds at intersecting points 402 between the first layer of FIG. 3 and an additional layer at the next, successive z-axis position thereby forming the pattern shown in FIG. 4.

FIG. 5 shows an example of the results when a second layer 502 is not rotated relative to a first layer 504, but instead is phase shifted about one-hundred eighty degrees and positioned such that vertices of the second layer 502 overlap and intersect with vertices of the first layer 504. In this embodiment, the turns in the vertices may also be placed closer together. As shown in the figure, the pattern approximates a linear grid that appears to have ninety degree turns but is actually composed of two closely spaced 135 degree turns. The pattern may exploit the adhesive nature of plastic (or other build material) to join adjacent layers. Thus, the pattern may print faster because there is less deceleration of a tool head (which may generally be needed for acute angle turns), while also advantageously reducing internal stresses and resulting deformation because, as noted above, the lengths of material in each infill layer can cool and contract with very little end-to-end stress placed on the perimeter of the layer.

The one-hundred eighty degree phase shifting as described herein may include inverting a first pattern of the first layer to form the second layer that is adjacent to first layer. In other words, the first pattern of the first layer and a second pattern of the second layer may be the same, but just facing opposite directions from one another. In the figure shown, the turns in the vertices are disposed close together, i.e., where the smallest edge in the turn is scaled down and brought closer to a neighboring line of filament in another layer.

Figure 7:
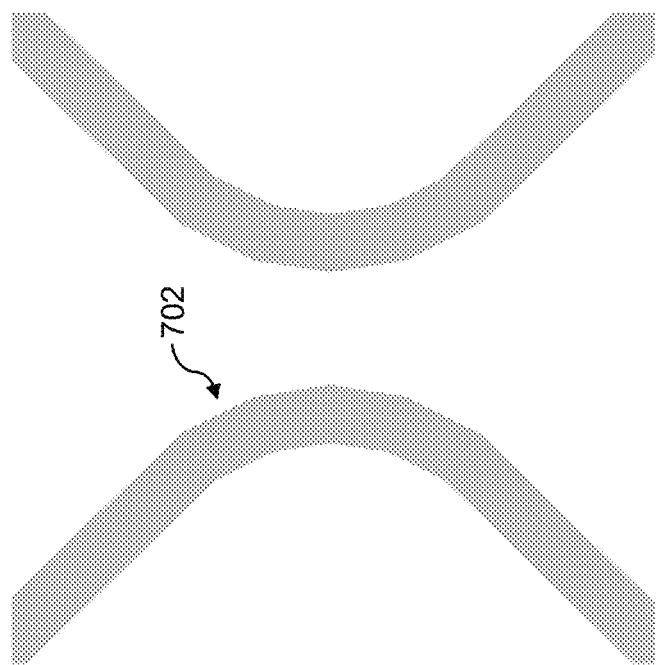
Figure 6:
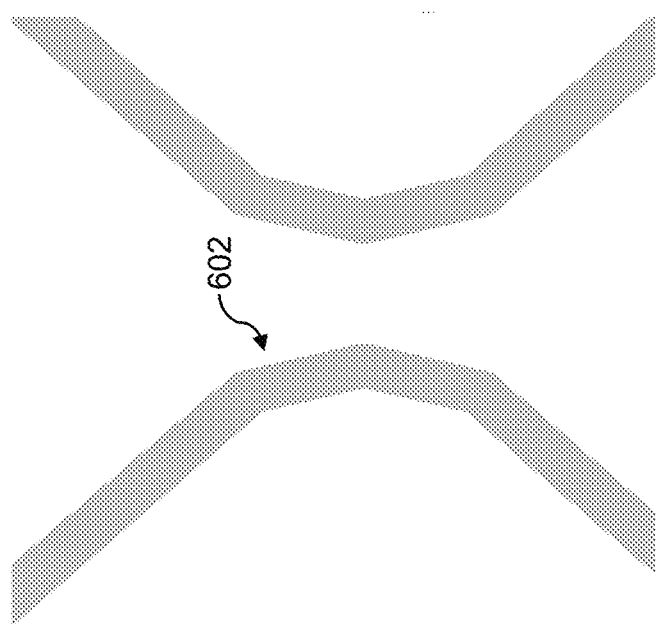

FIGS. 6 and 7 show examples of sharp angle turns of a length formed by numerous obtuse angle turns. By including more turns in the tool path at wide angles that, as an aggregate, approximate a ninety degree turn (or other sharp angle turn), a print may be maintained at high speeds. For example, FIG. 6 shows a composite turn 602 formed by three turns at 150 degrees per turn, and FIG. 7 shows a composite turn 702 formed by five turns at 162 degrees per turn. One of ordinary skill will recognize that many combinations of turns are possible, and the foregoing are provided by way of example only. However, segments in a tool path may become too small to print and the number of turns may become too large to be efficient. Thus, a preferred configuration may include between two and five turns that approximate a substantially ninety degree (or less) turn for advantageous print speed and quality. These patterns may also distort gracefully and settle at a steady state configuration when they do distort. By way of example, infill patterns as discussed herein may be faster than a standard hexagonal pattern of the prior art by approximately 23% with two turns, 35% with three turns, and 46% with five turns.

Figure 9:
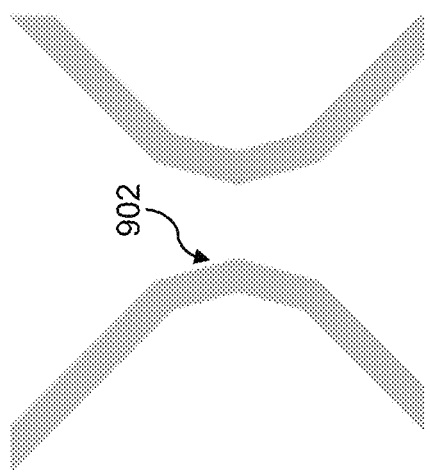
Figure 11:
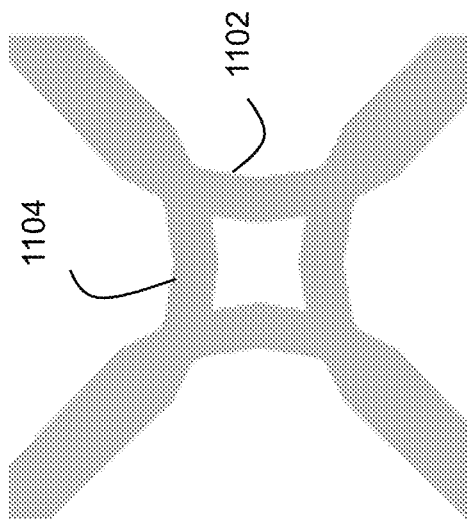
Figure 8:
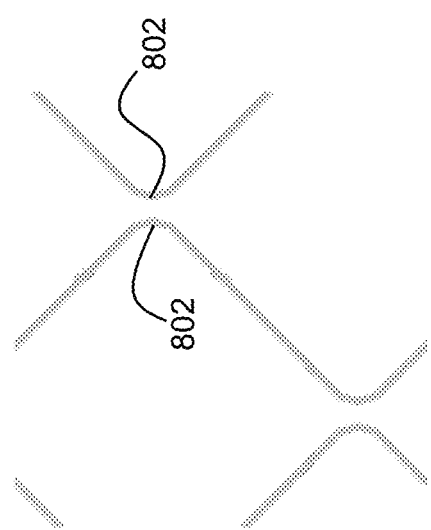
Figure 10:
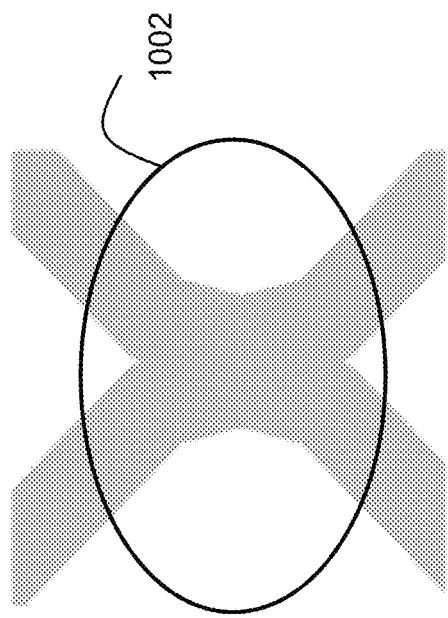

FIG. 8 shows lengths of material in a single x-y plane that are one-hundred eighty degrees out of phase so that vertices 802 in adjacent paths are substantially disposed next to one another. FIG. 9 shows a close up view of a pair of vertices 902 formed of obtuse angles. As shown in FIG. 10, adjacent paths may be positioned sufficient close for vertices to contact or intersect one another and form a bond 1002 between the two paths in a single x-y plane. As shown in FIG. 11, a pattern may be rotated in a next adjacent z-axis layer so that a first path 1102 in a first plane intersects at various locations with a second path 1104 in a second plane—e.g., this figure may be formed by rotating the pattern of FIG. 9 in a next adjacent z-axis layer.

FIGS. 12-14 show other arrangements of intersecting paths in one or two layers. Specifically, FIG. 12 shows a pattern 1200 formed by first lengths 1202 that have first vertices 1204 completely offset from second vertices 1206 of second lengths 1208. FIG. 13 shows a pattern 1300 formed by first lengths 1302 that have first vertices 1304 aligned with second vertices 1306 of second lengths 1308, but where the vertices are not touching. FIG. 14 shows a pattern 1400 formed by a hybrid of different patterns of lengths from layer to layer.

Figure 16:
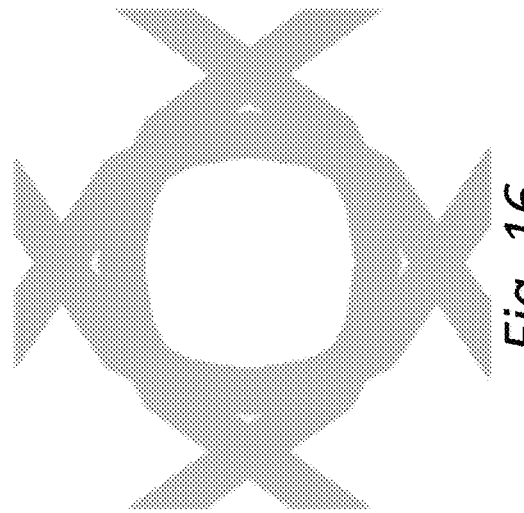
Figure 18:
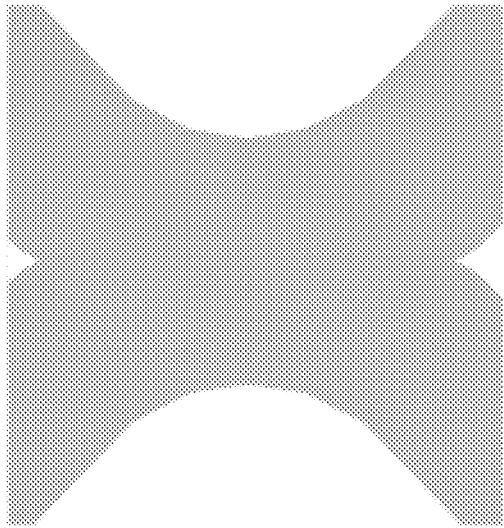
Figure 15:
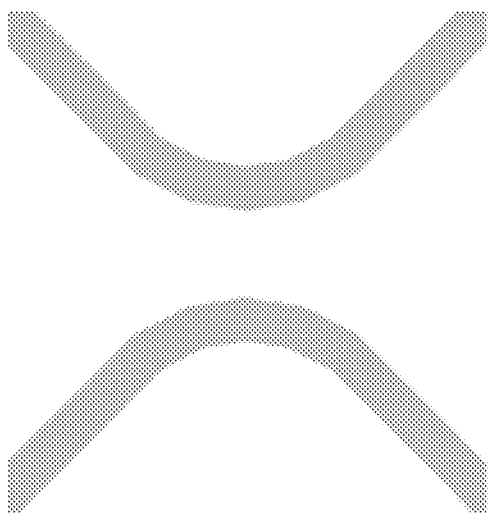
Figure 17:
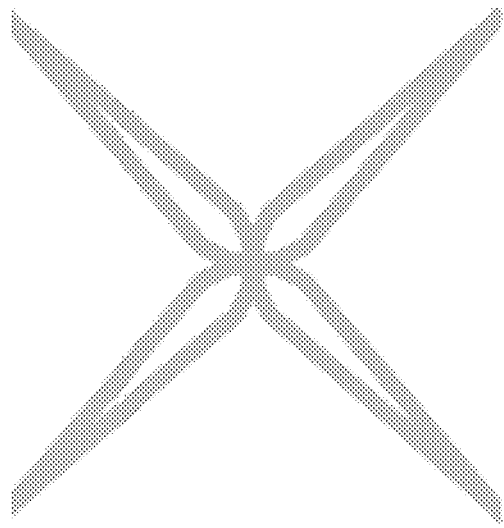

FIGS. 15-18 show examples of infill patterns having substantially icosagonal diamond shapes. Specifically, FIG. 15 shows an example of the turns. FIG. 16 shows an example of a substantially diamond shape that can be formed using this technique. FIG. 17 shows another example of a substantially diamond shape that can be formed using this technique. Finally, FIG. 18 shows a turns forming a bond between lengths in an infill pattern. The substantially diamond shapes of these figures may include, e.g., four extra sections for the turn between two diamond sides that enables the tool head to turn at about 162 degree angles, thus enabling higher speeds than that of ninety degree angles. One skilled in the art will recognize that other polygonal diamond shapes are also or instead possible.

Figure 20:
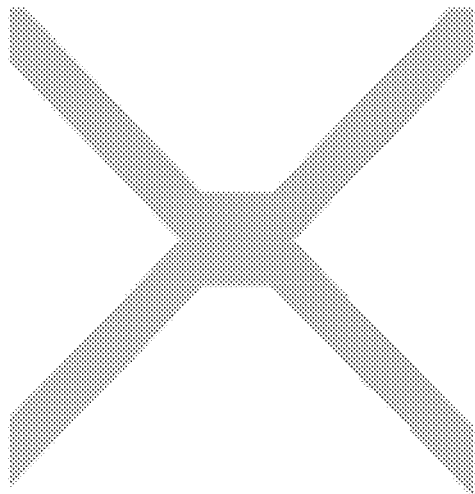
Figure 22:
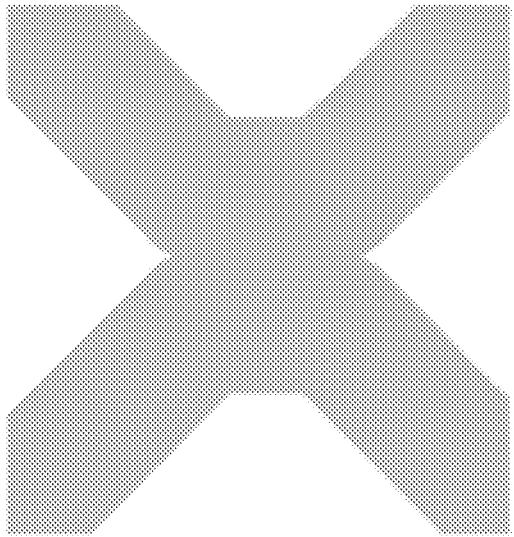
Figure 19:
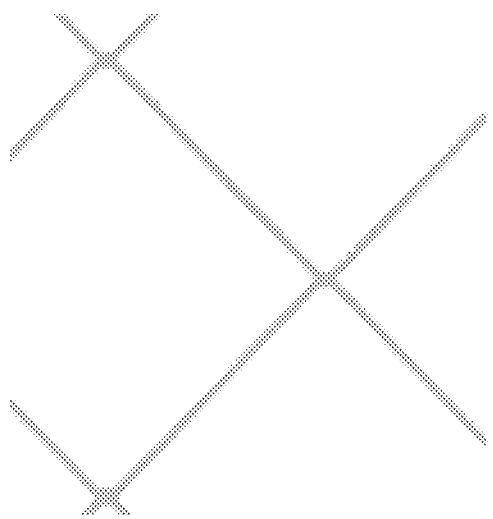
Figure 21:
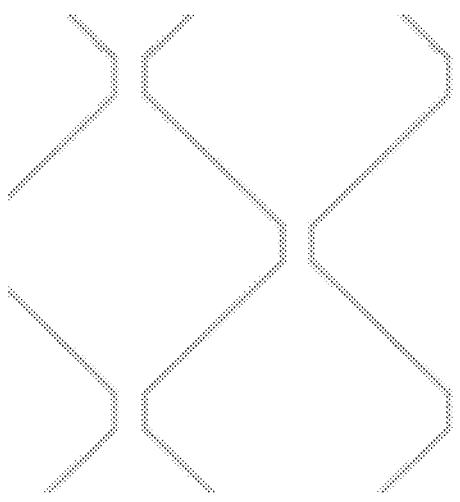
Figure 24:
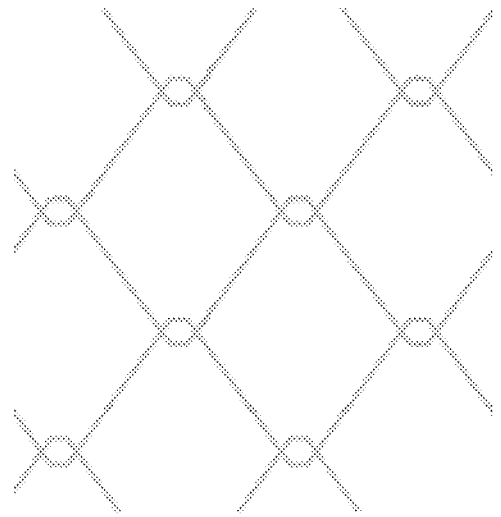
Figure 25:
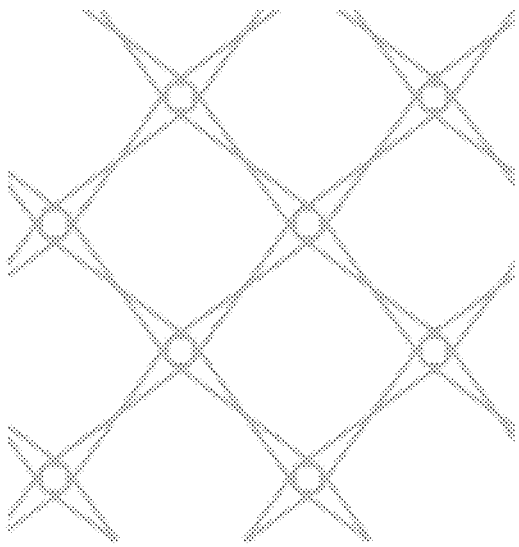
Figure 23:
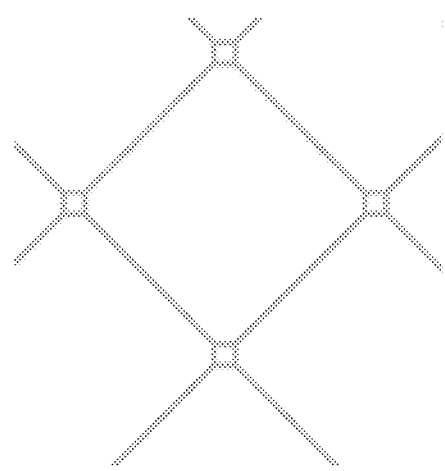

FIGS. 19-25 show examples of infill patterns having substantially octagonal diamond shapes. The substantially octagonal diamond shapes may include one extra section for the turn between two diamond sides that enables the tool head to turn at about 135 degree angles, thus enabling higher speeds than that of ninety degree angles. Specifically, FIG. 19 shows adjacent paths with vertices that contact one another using such turns, and FIG. 20 shows a close up of the bond formed between two paths in a single x-y plane. FIGS. 21 and 22 show how the turn distance can affect the length of the turn between the two long sides. Because patterns may be isomorphic and overlap along the long sides, when viewed from the the top the sides form a rectangle as shown in FIG. 23. Overlapping may have an impact on the speed of printing since it both increases the distance traveled and the angle at which the tool head turns by extending all the points away (perpendicularly) from the main axis of the infill line enabling patterns to overlap—see FIG. 24 and the associated top view for multiple layers in FIG. 25.

Figure 27:
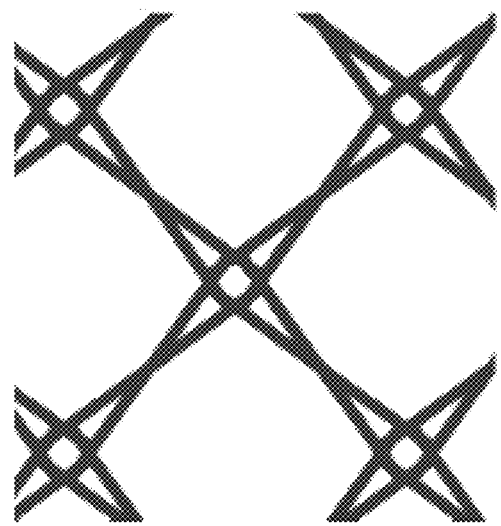
Figure 29:
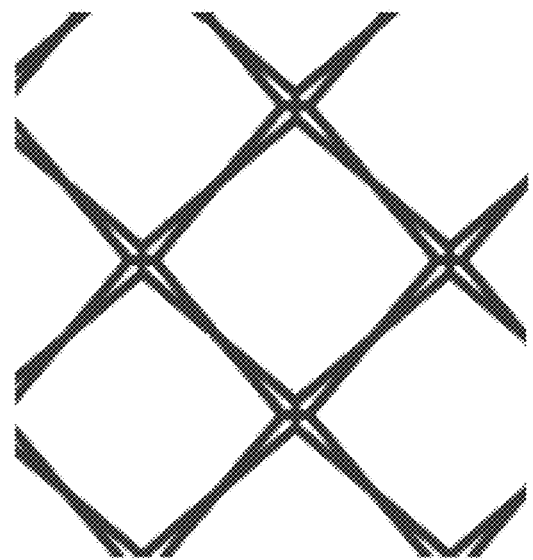
Figure 26:
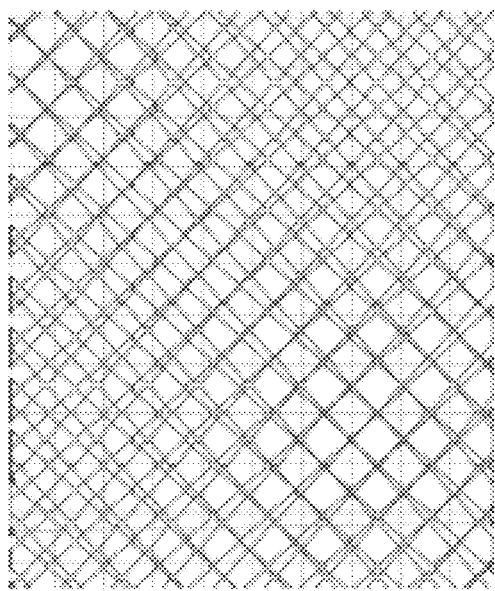
Figure 28:
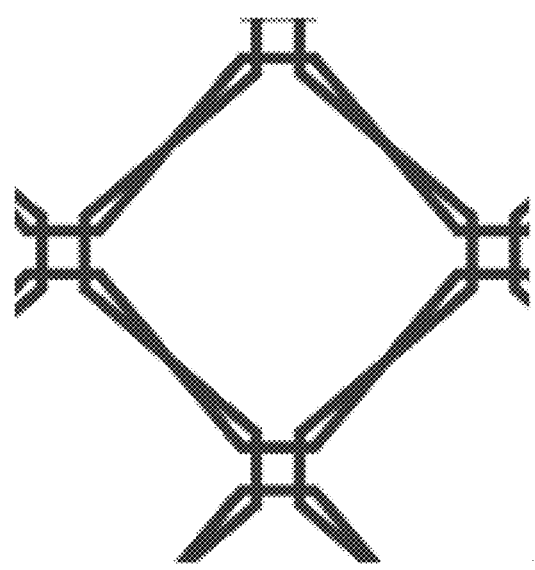

FIGS. 26-33 show examples of infill patterns having substantially diamond shaped patterns with small quadrilaterals (e.g., boxes) at the junctions. This may provide high angle turns and an increased infill density. Specifically, FIG. 26 shows an infill pattern that creates larger quadrilaterals in some areas and smaller quadrilaterals in other areas. FIGS. 27-29 show an infill pattern with quadrilaterals formed in substantially in a central portion of an x-shaped pattern. FIG. 27 shows an infill pattern having substantially triangular or diamond shapes projecting from a side of the quadrilateral. FIG. 28 shows an infill pattern having substantially triangular or diamond shapes projecting from a corner of the quadrilateral. FIG. 29 shows an infill pattern having substantially diamond shapes with apexes forming small quadrilaterals or intersection points. FIG. 30 shows another infill pattern having substantially diamond shapes projecting from a corner of the quadrilateral. FIG. 31 shows an infill pattern formed by paths that intersect to provide substantially diamond shapes and substantially quadrilateral shapes surrounded by relatively thick borders of build material. FIG. 32 shows lengths printed along one or more layers where the lengths have yet to intersect or couple at vertices to form the substantially quadrilateral shapes. FIG. 33 shows lengths printed along two or more layers where the lengths intersect or couple at vertices to form the substantially quadrilateral shapes FIG. 34 shows examples of three-dimensional printed infills. Specifically, this figure shows the three-dimensional cells 3402 that may be formed by the rotation or shift of infill patterns to provide structural integrity to a printed object 3400.

FIG. 35 shows a first layer of an infill pattern. Specifically, the figure shows a toolpath 3500 for forming the first layer of an infill pattern. The figure also shows an extrusion width infill pattern 3502, which takes into account the thickness of the extruded material forming the infill. As shown in the figure, the lengths 3504 may include a group of vertices with no turns having an angle less than ninety degrees.

FIG. 36 shows a second layer of an infill pattern. Specifically, the figure shows a toolpath 3600 for forming the second layer of an infill pattern. The figure also shows an extrusion width infill pattern 3602, which takes into account the thickness of the extruded material forming the infill. The infill pattern shown in this figure may represent the second layer of infill disposed on top of a first layer, i.e., the first layer described above with reference to FIG. 35. The lengths of the second layer may intersect the lengths of the first layer thereby connecting their respective vertices. The lengths of the second layer may similarly include a group of vertices with no turns having an angle less than ninety degrees.

Figure 37:
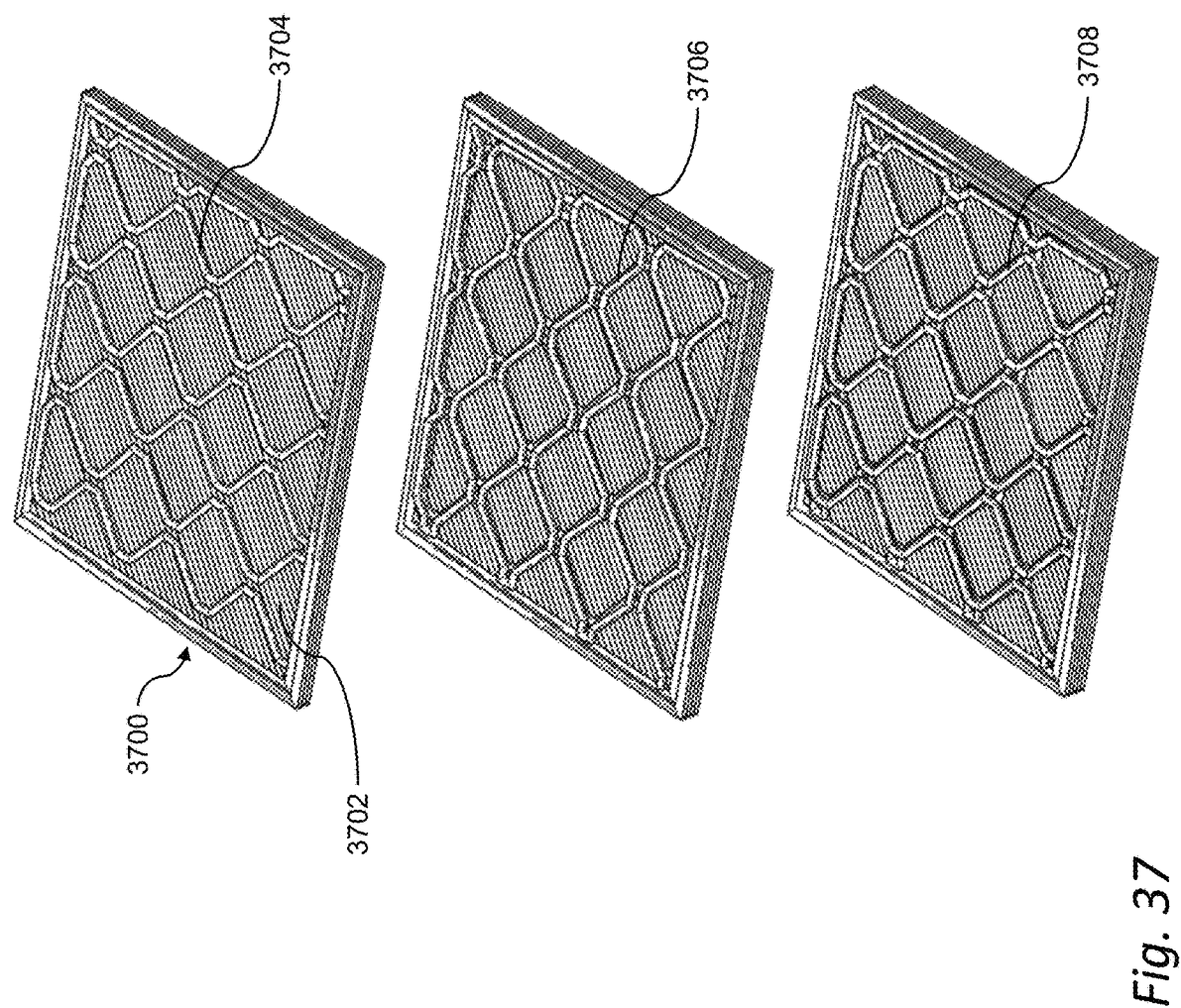
FIG. 37 shows a progression of an infill pattern.

FIG. 37 shows a progression of an infill pattern. Specifically, the figure shows isometric views of the fabrication of various layers of the infill 3700 within the shell 3702 of a three-dimensional object. As shown in the figure, the infill 3700 may include a first layer 3704, a second layer 3706 disposed on top of the first layer 3704, and a third layer 3708 disposed on top of the second layer 3704. The infill pattern shown in this figure may represent an isometric view of the layers shown in the figures described directly above.

A three-dimensional object may thus be fabricated using the infilling techniques described herein. The three-dimensional object may include a perimeter having a two-dimensional cross section of a shell of the object, and infill for the perimeter including a plurality of lengths of build material spanning the perimeter in a direction. The plurality of lengths may include a group of at least two vertices with no turns having an angle less than ninety degrees.

The above systems, devices, methods, processes, and the like may include tool instructions for implementing the infilling techniques described herein. For example, an aspect includes generating tool instructions for building a three-dimensional object with a three-dimensional fabrication process. The tool instructions may include instructions for fabricating an object using the infilling techniques described herein. Specifically, the tool instructions may include instructions for fabricating a perimeter of the object, where the perimeter includes a two-dimensional cross section of a shell of the object at a first z-axis height. The tool instructions may also or instead include instructions for fabricating a first infill layer for the perimeter including a first plurality of lengths of build material spanning the perimeter in a first direction, where the first plurality of lengths include non-intersecting paths of build material containing a first group of vertices with no turns having an angle less than ninety degrees. The tool instructions may also or instead include instructions for fabricating a second perimeter of the object including a second two-dimensional cross section of the shell at a second z-axis height adjacent to the first z-axis height in the three-dimensional fabrication process. The tool instructions may also or instead include instructions for fabricating a second infill layer for the second perimeter including a second plurality of lengths of build material, where the second plurality of lengths include non-intersecting paths of build material containing a second group of vertices with no turns having an angle less than ninety degrees, and where at least one of the second group of vertices overlaps with at least one of the first group of vertices to form a z-axis bond between the first infill layer and the second infill layer.

The foregoing infilling techniques may include the use of relatively fast printing, axially (e.g., vertically) gapless, and bi-orthogonal sparse infill patterns. In this manner, sparse infill patterns can be structurally sound (e.g., by being printed along two orthogonal directions and without vertical gaps) and fast to print (e.g., because they can contain only wide-angle turns, avoiding turns of ninety degrees and less).

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising non-transitory computer-executable code embodied in a non-transitory computer readable medium that, when executing on one or more computing devices, performs the steps of:

generating tool instructions for building a three-dimensional object with a three-dimensional fabrication process, the tool instructions comprising instructions for fabricating:

a perimeter of the object, the perimeter including a two-dimensional cross section of a shell of the object at a first z-axis height;

a first infill layer for the perimeter, the first infill layer including a first plurality of lengths of build material spanning the perimeter in a first direction, wherein the first plurality of lengths include non-intersecting paths of build material containing a first group of vertices, wherein each vertex in the first group of vertices is formed by a discrete series of turns, wherein each turn in the discrete series of turns is greater than ninety degrees;

a second perimeter of the object, the second perimeter including a second two-dimensional cross section of the shell at a second z-axis height adjacent to the first z-axis height in the three-dimensional fabrication process; and a second infill layer for the second perimeter, the second infill layer including a second plurality of lengths of build material, wherein the second plurality of lengths include non-intersecting paths of build material containing a second group of vertices, wherein each one of the second plurality of lengths of build material is identical to and phase shifted by 180 degrees from an adjacent one of the first plurality of lengths of build material, wherein each vertex in the second group of vertices is formed by a discrete series of turns, wherein each turn in the discrete series of turns is greater than ninety degrees, and wherein at least one of the second group of vertices overlaps with at least one of the first group of vertices to form a z-axis bond between the first infill layer and the second infill layer.

2. The computer program product of claim 1, wherein each one of the first plurality of lengths of build material is parallel to each other one of the first plurality of lengths.

3. The computer program product of claim 1, wherein the second plurality of lengths of build material span the second perimeter in a second direction orthogonal to the first direction.

4. The computer program product of claim 1, wherein the second plurality of lengths of build material span the second perimeter in the first direction.

5. The computer program product of claim 1, wherein the first infill layer and the second infill layer include no turns having an angle less than ninety degrees.

6. The computer program product of claim 1, wherein each one of the first plurality of lengths of build material do not contact each other one of the first plurality of lengths.

7. The computer program product of claim 1, wherein each one of the first plurality of lengths of build material are coupled to each other one of the first plurality of lengths in one or more locations.

8. The computer program product of claim 1, wherein the second infill layer is adjacent to the first infill layer, and wherein each vertex of the second group of vertices is coupled with each vertex of the first group of vertices to form the z-axis bond between the first infill layer and the second infill layer.

9. The computer program product of claim 8, wherein the tool instructions comprise instructions for fabricating a cell for the three-dimensional object by coupling each vertex of the second group of vertices with each vertex of the first group of vertices.

10. The computer program product of claim 1, wherein all intersections between the first infill layer and the second infill layer occur at offset z-axis positions.

* * * * *